United States Patent [19]

Molieri et al.

[11] Patent Number: 5,221,885
[45] Date of Patent: Jun. 22, 1993

[54] LOW-POWER DUAL VOLTAGE DRIVE CIRCUIT AND METHOD

[75] Inventors: Eduardo M. Molieri, Mesa; Susan D. Stephens, Chandler, both of Ariz.; Andrew W. Hardell, Seguin, Tex.; David L. Barron, Scottsdale, Ariz.

[73] Assignee: Motorola, Inc., Schaumburg, Ill.

[21] Appl. No.: 695,061

[22] Filed: May 3, 1991

[51] Int. Cl.⁵ .............................................. G05B 19/40
[52] U.S. Cl. ..................................... 318/685; 318/695
[58] Field of Search ................................. 318/685, 696

[56] References Cited

U.S. PATENT DOCUMENTS

| | | | |
|---|---|---|---|
| 4,829,222 | 5/1989 | Hallenbeck et al. | 318/696 X |
| 4,918,365 | 4/1990 | Tanuma et al. | 318/685 X |
| 4,928,049 | 5/1990 | Pietrobon et al. | 318/685 X |
| 5,034,674 | 7/1991 | Sato | 318/696 X |

Primary Examiner—William M. Shoop, Jr.
Assistant Examiner—Karen Masih
Attorney, Agent, or Firm—Jeffrey D. Nehr

[57] ABSTRACT

A low-power dual voltage drive circuit and method which includes controlling a stepper motor overdriven with a high voltage. The stepper motor drive circuit includes a high voltage supply for overdriving the stepper motor, a low voltage supply, and an overdrive switch mechanism connected between the high voltage supply means and the stepper motor input. The method includes repetitively triggering the overdrive switch in response to a control signal, overdriving the stepper motor with the high voltage, producing an overdrive current, sensing the overdrive current, producing an additional control signal when the overdrive current reaches a preset value, switching off the overdrive current in response to the second control signal, resetting the overdrive switch to enable the overdrive switch to again receive the first control signal, and driving the stepper motor with a nominal low voltage.

12 Claims, 1 Drawing Sheet

LOW-POWER DUAL VOLTAGE DRIVE CIRCUIT AND METHOD

BACKGROUND OF THE INVENTION

This invention relates in general to the field of rapidly energizing coils and in particular to controlling stepping motors with a low-power motor drive circuit.

Many electronic applications involving solenoids, transformers, and other inductors involve energizing an inductor which has a relatively long characteristic time constant. One such electronic device containing an inductive coil is a stepper motor. Stepper motors are used extensively in electromechanical positioning systems, with applications in tape drives, floppy disk drives, numerically controlled machinery, and other digitally controlled positioning systems. Stepper motors are particularly important for electronic products such as printers, scanners, plotters, and facsimile machines.

Stepper motor applications often require high step rates, which can be achieved by increasing the size of the stepper motor (at increased cost), or by using a smaller motor (with less torque) and overdriving it to increase its speed. Long characteristic time constants relative to short desired response times can cause poor or unacceptable performance in the stepper motor within a printer, scanner, or plotter.

Rapid stepping requires a high rate of change of current over time in the stepper motor windings. Current overvoltage stepper motor drive circuits attempt to correct poor stepper motor response by driving the stepper motor with a higher voltage than the nominal voltage. For example, an R-4R technique can be used to drive a 5 Volt (V) stepper motor of internal resistance R with 25 V across a 4R resistor in series with the stepper motor. The result is that the current in the stepper motor rises faster with the fivefold increase in voltage than it would otherwise. The cost of the technique, however, is that the 4R resistor continues to dissipate power after the stepper motor has been fully energized. In fact, a full 80% of the energy supplied is dissipated by the 4R resistor, while the motor receives only 20% of the input energy. Thus, the efficiency of such a design is 20% at maximum.

An improvement on the R-4R circuit can also be employed. Adding a sense amplifier on a control transistor in the high voltage supply (25 V in the last example), can be used to achieve a faster response. The improvement still dissipates 80% of the power supplied by the series limit circuit, however.

SUMMARY OF THE INVENTION

A low-power dual voltage drive circuit and method is contemplated which includes controlling a stepper motor overdriven with a high voltage. The method includes repetitively triggering an overdrive switch in response to a control signal, coupling the high voltage to the stepper motor, overdriving the stepper motor with the high voltage, producing an overdrive current, sensing the overdrive current through a resistor, producing an additional control signal when the overdrive current reaches a preset value, switching off the overdrive current in response to the second control signal, resetting the overdrive switch to enable the overdrive switch to again receive the first control signal, and driving the stepper motor with a nominal low voltage. The stepper motor drive circuit comprises a high voltage supply for overdriving the stepper motor, a low voltage supply to drive the stepper motor at a nominal level, and an overdrive switch mechanism between the high voltage supply means and the stepper motor input.

The above and other features and advantages of the present invention will be better understood from the following detailed description taken in conjunction with the accompanying drawings.

DETAILED DESCRIPTION OF THE PREFERRED EMBODIMENT

A four-phase motor is discussed. Alternative embodiments in accordance with the invention are possible with any even number of phases.

Separate stepper motor drive circuits are required for the odd phases (i.e., the first and third phases) and even phases (i.e., the second and fourth phases) of the stepper motor. The FIG. 1 circuit represents a stepper motor drive circuit for the odd phases of a four-phase motor. The stepper motor drive circuit for the even phases is identical to the circuit in FIG. 1, with phases one and three replaced by phases two and four, respectively.

Figure 1:
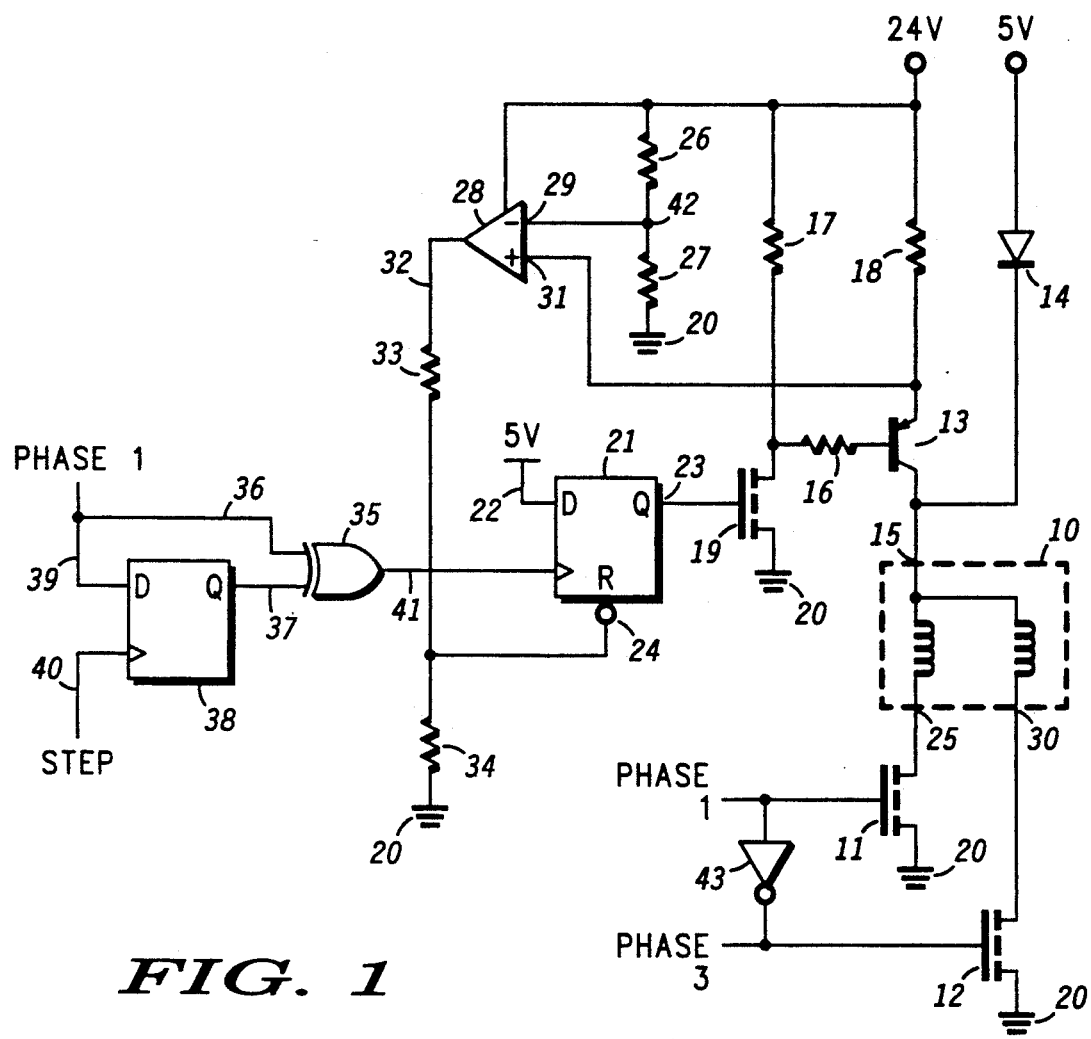
In FIG. 1, there is shown a circuit schematic for a low-power dual voltage stepper motor drive circuit in accordance with a preferred embodiment of the invention.

In FIG. 1 there is shown a stepper motor 10 with motor input 15, motor phase one input 25, and motor phase three input 30. Stepper motor 10 phase one input 25 is coupled through power transistor 11 to electrical ground 20. The gate of power transistor 11 is driven directly by phase one input. Stepper motor 10 phase three input 30 is coupled through power transistor 12 to electrical ground 20. The gate of power transistor 12 is driven directly by phase three, which is derived from phase one by inverter 43.

Diode 14 is coupled between the 5 V low voltage supply and motor input 15 to prevent current from the high voltage supply, when engaged, from being sent back through the low voltage supply. The 24 V high voltage supply is connected to resistor 18, which is in turn connected to the emitter of transistor 13. The collector of transistor 13 is coupled to motor input 15. The base of transistor 13 is coupled to a first terminal of resistor 16. The second terminal of resistor 16 is connected through power transistor 19 to electrical ground 20. Resistor 17 is coupled between the high voltage (24 V) and the non-ground side of power transistor 19. The gate of power transistor 19 is coupled to the Q output 23 of flip-flop 21. Flip-flop 21 also has D-input 22, which is coupled to a high logic level, such as 5 V. Flip-flop 21 also includes R input (reset pin) 24, which is coupled through resistor 34 to electrical ground 20.

The 24 V high voltage supply is connected to comparator 28, as well as through the series combination of resistors 26 and 27 to electrical ground 20. Resistors 26 and 27 comprise a voltage divider with junction point 42 between resistors 26 and 27. Junction point 42 is coupled to the comparator 28 negative input 29. The emitter of transistor 13 is coupled to the comparator 28 positive input 31. The output 32 of the comparator 28 is coupled through resistor 33 to R input 24. R input 24 is coupled through resistor 34 to electrical ground 20. Resistors 33 and 34 comprise a voltage divider.

A second flip-flop 38 includes D-input 39 which is coupled to the phase one input, step (clock) input 40, and Q-output 37 which is coupled to exclusive-or gate 35. A second input of exclusive-or gate 35 is coupled to phase one input 36. Exclusive or gate 35 has exclusive-or output 41 coupled to a third input (clock) of flip-flop 21.

Figure 2:
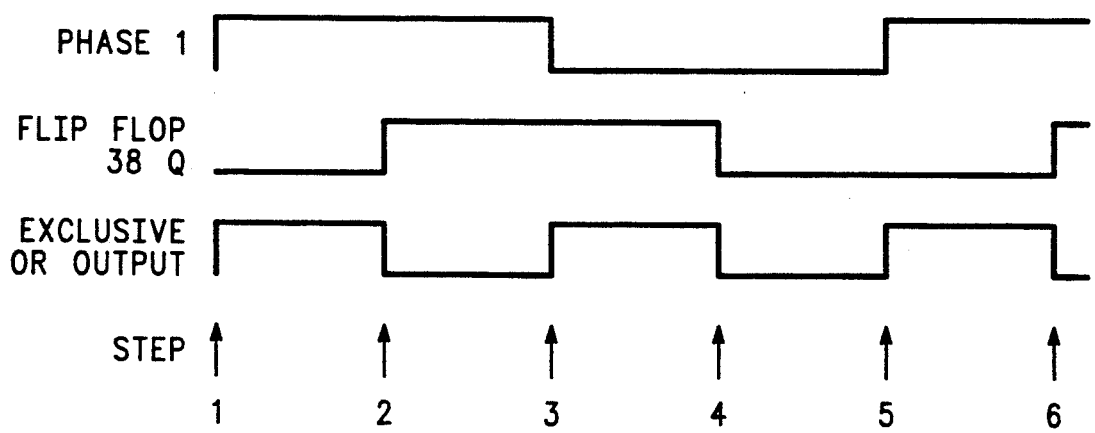
In FIG. 2 there is shown a schematic of the relative timing of several inputs and outputs from various circuit components from FIG. 1.

FIG. 2 shows a schematic of the relative timing of several inputs and outputs from various circuit components from FIG. 1. The step command input provides a clock for the operation of the circuit. The phase one input and the flip-flop 38 Q-output shown form inputs into the exclusive-or gate 35 of FIG. 1.

In operation, the stepper motor 10 phase one output 25 and the stepper motor 10 phase three output 30 in FIG. 1 are used to turn on power transistor 11 and power transistor 12, respectively. Without the high voltage (24 V) circuit power applied to the stepper motor 10, current flows from the low voltage (5 V) source through diode 14 to motor input 15. The current induced by the low voltage flows through power transistor 11 or power transistor 12 to electrical ground 20. This is the normal low voltage operation of the stepper motor 10, with operation at the stepper motor's nominal voltage level. Power transistor 11 and power transistor 12 are never on at the same time.

Because diode 14 is a series element which reduces the efficiency of this design, it should therefore have a low forward voltage drop. A diode with a 0.4 V voltage drop can be used, resulting in an estimated efficiency of 92% (i.e., only 8% of the available energy from the low voltage source being dissipated by diode 14). The efficiency can be improved by using higher voltage motors and an associated higher "low voltage" power supply, or by using a diode 14 with a lower forward voltage drop.

The high voltage drive circuit uses resistor 18 to sense current. Transistor 13, power transistor 19, and resistors 16 and 17 comprise a high voltage switch combination. Resistor 18 is chosen so that when high voltage to low voltage switchover is desired, the voltage drop across resistor 18 triggers comparator 28. As an example, this embodiment can use a 2 V drop across resistor 18 when 0.5 Amperes (A) of current are flowing.

Resistors 26 and 27 are chosen to appropriately scale the voltage drop across resistor 18 for comparator 28. Comparator 28 compares the scaled voltage drop across resistor 18 to a preset value set by resistors 26 and 27. When the comparator 28 "sees" a scaled voltage drop in excess of that preset value, its output 32 switches to the low state.

Whenever transistor 13 is off, the output of comparator 28 is "high", and that high output divided down to transistor-transistor logic (TTL) levels through the resistor divider network of resistors 33 and 34 is input to the reset pin 24 of flip-flop 21. Flip-flop 21 is configured such that it is not reset with a "high" input to the reset pin 24. Flip-flop 21 is designed instead to reset with a "low" input to reset pin 24. The output 32 of comparator 28 swings from 0 V to 24 V. When the output 32 is at 0 V, flip-flop 24 is in reset (0 V); when output 32 is at 24 V, the voltage divider represented by resistors 33 and 34 between the output 32 and electrical ground 20 produce approximately 4 V at the reset pin 24. (The reset pin 24 must be kept below the TTL level of 5 V.)

Thus, when the high voltage supply is overdriving stepper motor 10 and the current through resistor 18 exceeds the desired level (i.e., creating a 2 V drop across resistor 18 in this example, which coincides with nominal 0.5 A current flow through stepper motor 10), comparator 28 is tripped, causing comparator output 32 to switch, resetting flip-flop 21.

When flip-flop 21 resets, the Q-output of flip-flop 21 turns off power transistor 19, and, in turn, transistor 13 is turned off at its base through resistor 16. With transistor 13 off, comparator 28 again has a "high" output and is back to the mode allowing another step to take place. The high voltage supply is disengaged from stepper motor 10, and the low voltage supply drives stepper motor 10 at its nominal level.

Flip-flop 38 also controls turning on the high voltage (24 V) to the stepper motor 10 through transistor 13. Flip-flop 38 could be the same flip-flop that is used in a phase generator circuit. Note in FIG. 2 that the output of the exclusive-or gate 35 transitions low to high whenever there is a transition (low to high or high to low) of phase one. Similarly, the output of the exclusive-or gate 35 transitions low to high whenever there is a transition (low to high or high to low) of phase three. The result is the exclusive-or output shown in FIG. 2. The "cloked one-shot" combination of flip-flop 38 and exclusive-or gate 35 in FIG. 1 then turns on transistor 13 based on the output 41 of exclusive-or gate 35.

During high voltage operation, only resistor 18 dissipates power. If the stepper motor 10 is a 0.5 A motor, the time necessary to bring phase one to its high voltage kickoff point is short, however, e.g., less than 200 microseconds, with stepping every 10 milliseconds. Resistor 18 can be a 0.25 Watt (W) resistor to more than handle the small average power dissipation. A low wattage resistor 18 can also serve as a fuzing element to prevent damage to the motor in case the current switch circuit fails.

The simple control loop described allows the stepper motor 10 to receive a voltage and current boost which can be used to speed up the inductive rise of the current through the stepper motor 10 inductor field, and increase the stepper motor 10 torque. The high voltage response can be on the order of three times faster than the R-4R method. The circuit can be used both for overlapping and non-overlapping phase generators. When driven by an overlapping phase generator, higher torques are produced.

The stepper motor drive circuit can be used in the case of a four-phase generator driving a stepper motor bi-directionally. The drive circuit is totally digital and can therefore be implemented using discrete parts, programmable logic arrays (PLAs), or custom integrated circuits (ICs).

Thus, a low-power dual voltage stepper motor drive circuit and method has been described which overcomes specific problems and accomplishes certain advantages relative to prior art methods and mechanisms. The improvements over known technology are significant. The simplicity and low part count allow for a simpler, smaller, and lower cost device. The high power dissipation and associated low efficiencies of previous stepper motor drive circuits and methods are avoided. Efficiencies of 92% have been achieved in a 5 V stepper motor embodiment in accordance with the invention. The low energy dissipation allows for surface mounting of the stepper motor drive circuit, or implementation on an integrated circuit (IC). The stepper motor drive circuit need not be implemented in a power device. The drive circuit is implementable on TMOS (Motorola) and HEXFET (Siliconix) systems.

Thus, there has also been provided, in accordance with an embodiment of the invention, a low-power dual voltage drive circuit and method that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A method for overdriving with a high voltage a stepper motor driven at a nominal low voltage, the method comprising the steps of:
    triggering a digital logic overdrive switch comprising a plurality of flip-flops coupled to an exclusive-or logic gate in response to a first digital control signal;
    coupling the high voltage to the stepper motor through the digital logic overdrive switch;
    overdriving the stepper motor with the high voltage, producing an overdrive current;
    sensing the overdrive current through a resistor;
    producing a second digital control signal when the overdrive current reaches a preset value;
    switching off the digital logic overdrive switch and the overdrive current in response to the second digital control signal;
    resetting the digital logic overdrive switch to enable the digital logic overdrive switch to receive the first digital control signal; and
    driving the stepper motor with the nominal low voltage.

2. A method for overdriving with a high voltage a stepper motor driven at a nominal low voltage as claimed in claim 1, wherein the steps of triggering, coupling, overdriving, sensing, producing, switching, resetting, and driving are repeated in response to subsequent applications of the first control signal.

3. A method for overdriving with a high voltage a stepper motor driven at a nominal low voltage as claimed in claim 1, wherein the step of coupling the high voltage to the stepper motor comprises the step of coupling the high voltage to a first and a third phase winding of a four-phase stepper motor.

4. A method for overdriving with a high voltage a stepper motor driven at a nominal low voltage as claimed in claim 3, wherein the step of overdriving the stepper motor with the high voltage comprises the step of overdriving the first phase and the third phase of the four-phase stepper motor.

5. A method for overdriving with a high voltage a stepper motor driven at a nominal low voltage as claimed in claim 4, wherein the step of triggering a digital logic overdrive switch in response to a first digital control signal comprises the steps of:
    inputting a first phase signal into a first input of a first flip-flop of the plurality of flip-flops;
    inputting a step command into a second input of the first flip-flop;
    driving the exclusive-or logic gate with an output of the first flip-flop and the first phase signal;
    driving a first input of a second flip-flop of the plurality of flip-flops with an output of the exclusive-or logic gate;
    driving the base of a power transistor with the output of the second flip-flop; and
    driving the base of the overdrive switch with a first output of the power transistor.

6. A method for overdriving with a high voltage a stepper motor driven at a nominal low voltage as claimed in claim 5, wherein the step of producing a second digital control signal comprises the steps of:
    sensing the voltage across the resistor;
    inputting the voltage across the resistor and the preset value into a comparator; and
    comparing the voltage across the resistor and the preset value.

7. A method for overdriving with a high voltage a stepper motor driven at a nominal low voltage as claimed in claim 6, wherein the step of producing a second digital control signal comprises the step of producing an output from the comparator when the overdrive current reaches the preset value.

8. A stepper motor drive circuit comprising:
    high voltage supply means for overdriving a stepper motor in response to a first digital control signal to produce an overdrive current;
    low voltage supply means;
    stepper motor input means coupled to the low voltage supply means to drive the stepper motor at a nominal rate; and
    digital logic overdrive switch means coupled between the high voltage supply means and the stepper motor input means, wherein the digital logic overdrive switch means comprises a voltage divider carrying the overdrive current and a comparator coupled to the voltage divider to produce a second digital control signal when the overdrive current exceeds a predetermined value.

9. A stepper motor drive circuit as claimed in claim 8, wherein the digital logic overdrive switch means further comprises a digital overdrive switch reset means to electrically disconnect the high voltage supply from the stepper motor input means in response to the second digital control signal.

10. A stepper motor drive circuit as claimed in claim 9, wherein the digital overdrive switch reset means comprises:
    first flip-flop means with a first flip-flop reset input wherein the second digital control signal is input to the first flip-flop reset input, a first flip-flop second input coupled to a bias voltage, a first flip-flop third input, and a first flip-flop output; and
    power transistor means with a first input coupled to an electrical ground, a second input coupled to the first flip-flop output, and an output; and
    transistor switch means coupled between the series resistor and the stepper motor input means, with a base of the transistor switch means coupled to the output of the power transistor.

11. A stepper motor drive circuit as claimed in claim 10, wherein the digital logic overdrive switch means further comprises a digital overdrive trigger means to electrically connect the high voltage supply means to the stepper motor input means in response to the first digital control signal.

12. A stepper motor drive circuit as claimed in claim 11, wherein the digital overdrive trigger means comprises:

second flip-flop means with a second flip-flop first input to receive a step clock signal, a second flip-flop second input to receive a phase signal, and a second flip-flop output; and exclusive-or logic means with a first input port to receive the second flip-flop output, a second input port to receive the phase signal, and an output port coupled to the first flip-flop third input to electrically connect the high voltage supply to the stepper motor input means in response to the phase signal and the step clock signal.

* * * * *